United States Patent [19]

Hill et al.

[11] Patent Number: 4,564,159

[45] Date of Patent: Jan. 14, 1986

[54] AUTOMATIC BALLOON LAUNCHING SYSTEM

[75] Inventors: Geoffrey E. Hill, 1789 Country Club Dr., Logan, Utah 84321; Duard S. Woffinden, Logan, Utah

[73] Assignee: Geoffrey E. Hill, Logan, Utah

[21] Appl. No.: 521,242

[22] Filed: Aug. 8, 1983

Related U.S. Application Data

[63] Continuation-in-part of Ser. No. 446,656, Dec. 3, 1982, Pat. No. 4,494,714.

[51] Int. Cl.$^4$ .............................................. B64B 1/58
[52] U.S. Cl. ....................................... 244/98; 244/31; 446/220; 239/14; 116/210; 141/248; 141/313
[58] Field of Search ...................... 244/31-33, 244/96-99, 63; 446/220; 239/2 R, 14; 116/210, DIG. 9; 251/9; 137/606, 628, 227.5; 141/248, 281, 10, 4, 67, 114, 313

[56] References Cited

U.S. PATENT DOCUMENTS

| | | | |
|---|---|---|---|
| 1,103,490 | 7/1914 | Cordray | 239/2 R |
| 3,118,672 | 1/1964 | Dorn | 446/220 |
| 3,536,110 | 10/1970 | West | 141/313 |
| 3,575,161 | 4/1971 | London | 251/9 |
| 3,785,557 | 1/1974 | Womack | 239/14 |
| 3,895,649 | 7/1975 | Ellis | 251/9 |
| 3,960,224 | 6/1976 | Silvers | 251/9 |
| 4,167,204 | 9/1979 | Zeyra | 446/220 |
| 4,185,582 | 1/1980 | Bryant | 116/DIG. 9 |

Primary Examiner—Galen L. Barefoot
Attorney, Agent, or Firm—Thorpe, North & Western

[57] ABSTRACT

A system for automatically filling and launching balloons which may be used, for example, for cloud seeding. The system includes a balloon launching station frame, a nozzle mounted on the frame onto which the narrow end of a balloon can be attached so that gas can flow through the nozzle into the balloon, a conduit coupled to a source of gas and to the nozzle for delivering gas through the nozzle into the balloon, gas flow control apparatus responsive to first signals for controlling the flow of gas through the conduit, and a release mechanism responsive to second signals for disengaging the balloon from the nozzle to thereby release the balloon to the atmosphere. For launching a series of balloons, the system may include a plurality of nozzles, conduits, gas flow control mechanisms, and release mechanisms arranged so that after one balloon is filled and released, a second balloon may be filled and launched at a selectable time thereafter, etc. The filling and releasing of the balloons is controlled by an electronic control unit which automatically applies the first and second signals at appropriate times.

10 Claims, 3 Drawing Figures

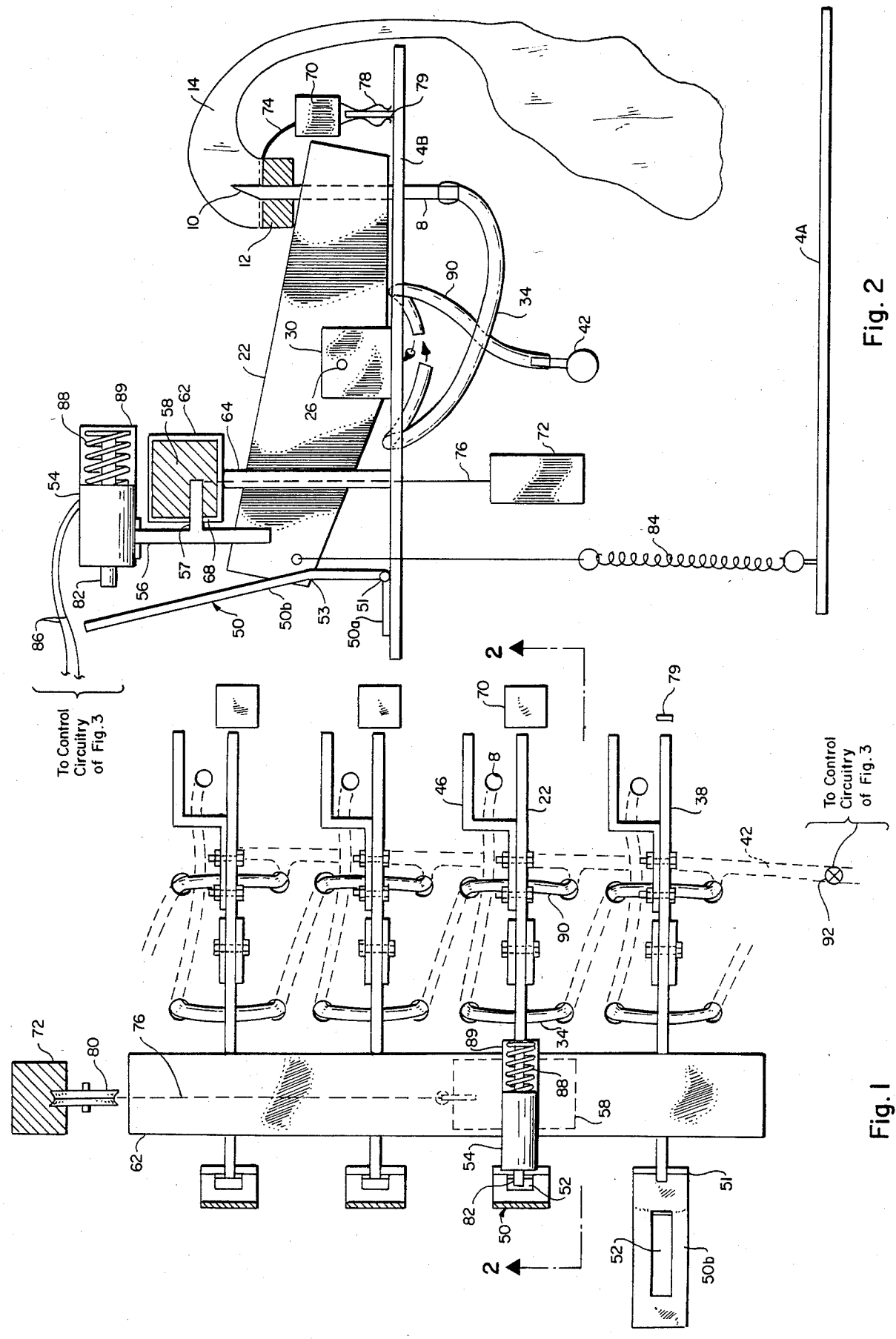

AUTOMATIC BALLOON LAUNCHING SYSTEM

BACKGROUND OF THE INVENTION

This is a continuation-in-part application of Ser. No. 446,656, filed December 3, 1982, now U.S. Pat. No. 4,494,714.

This invention relates to a system for automatically filling and launching balloons in the atmosphere.

The subject of weather modification and control has been a source of interest and study for many years. However, attempts at actual weather control have generally been limited to processes for so-called cloud modification to cause precipitation. To induce precipitation, it is common practice now to "seed" the cloud with artificial ice nuclei, such as silver iodide crystals, which provide sites on which supercooled liquid water (water whose temperature is below 0 degrees C. but which still exists in the liquid phase) can freeze to form ice crystals. When the ice crystals are large enough, they fall as precipitation, either rain, snow, sleet or hail, depending upon other factors such as air currents, temperature and humidity.

Conventional methods of seeding clouds include the use of ground generators to release artificial ice nuclei into the air. However, with this method, artificial ice nuclei are often confined to narrow plumes which may take many hours to reach appropriate cloud altitudes, or may not reach targeted clouds at all because of temperature inversions or an unexpected change in wind direction. Airborne cloud seeding has also been used but it is difficult to realize significant dispersion of the seeding material in the cloud and as a result much of the cloud does not get seeded. There are ways to overcome this problem with airborne seeding, but the solutions can be costly and hazardous (use of more aircraft), time consuming (release the material far upwind and allow it to be carried by air currents to mix with the cloud). Exemplary prior art references dealing with cloud seeding include U.S. Pat. Nos. 3,357,926, 3,545,677, and 3,441,214.

The present invention contemplates the use of balloon launched seeding materials to induce precipitation. Although balloons have long been used to carry instruments into the atmosphere for making various tests, there appears to have been no systems designed for either automatically or remotely filling and launching balloons either for cloud seeding or atmospheric measurements or tests. G. C. Malloney et al, U.S. Pat. No. 3,452,949, discloses a so-called "balloon launching system and method" by which large balloons, of the type used for carrying aloft heavy scientific equipment, are restrained while being inflated. J. W. Sparkman et al, U.S. Pat. No. 3,524,609, discloses a system for launching payload-carrying balloons. The apparatus described in Sparkman et al is primarily designed to keep the strain off payload lines until just prior to the launch of the balloon, and to accommodate changes in wind direction. Neither of the referenced patents suggests that balloons could be utilized to seed clouds and neither discloses an arrangement whereby a series of balloons may be automatically filled and launched.

SUMMARY OF THE INVENTION

It is an object of the invention to provide a system for automatically filling and launching balloons for use in cloud seeding, carrying scientific measuring devices aloft, etc.

It is also an object of the invention to provide such a system which may be operated remotely.

It is an additional object of the invention to provide such a system in which a series of balloons may be automatically filled with helium or other gas and launched in sequence.

It is a further object of the invention, in accordance with one aspect thereof, to provide such a system wherein upon launch of a balloon, the balloon payload is automatically enabled and later activated.

It is another object of the invention to provide a balloon launching system which is simple in design and easy to construct and maintain.

It is still another object of the invention to provide such a system which may be readily initialized in preparation for filling and launching balloons.

The above and other objects of the invention are realized in a specific illustrative embodiment thereof which includes a frame for supporting the components of the system. These components include a nozzle adapted to allow the mounting thereon of the narrow end of a balloon and to carry gas into the balloon. Also included is a conduit for carrying gas from a gas source to the nozzle and thus into the balloon. A gas flow control mechanism in response to signals produced by control circuitry controls the flow of gas through the conduit. A release mechanism also responds to signals produced at the appropriate time by the control circuitry by disengaging the balloon from the nozzle to thereby release the balloon to the atmosphere.

In accordance with one aspect of the invention, a payload is attached to the balloon and is automatically enabled at the time the release mechanism disengages the balloon from the nozzle.

In accordance with another aspect of the invention, a plurality of nozzles, conduits, gas flow control mechanisms, and release mechanisms are employed so that after one balloon is filled and released, a next balloon may be prepared for filling and releasing in the manner described above.

In accordance with still another aspect of the invention, a single release initiation mechanism sequentially operates each release mechanism to thereby sequentially launch balloons.

BRIEF DESCRIPTION OF THE DRAWINGS

The above and other objects, features and advantages of the invention will become apparent from a consideration of the following detailed description presented in connection with the accompanying drawings in which:

FIG. 1 is a top plan view of a series of balloon filling and releasing stations made in accordance with the principles of the present invention;

FIG. 2 is a side, elevational view of one of the balloon filling and releasing stations of FIG. 1.

DETAILED DESCRIPTION

Figure 3:
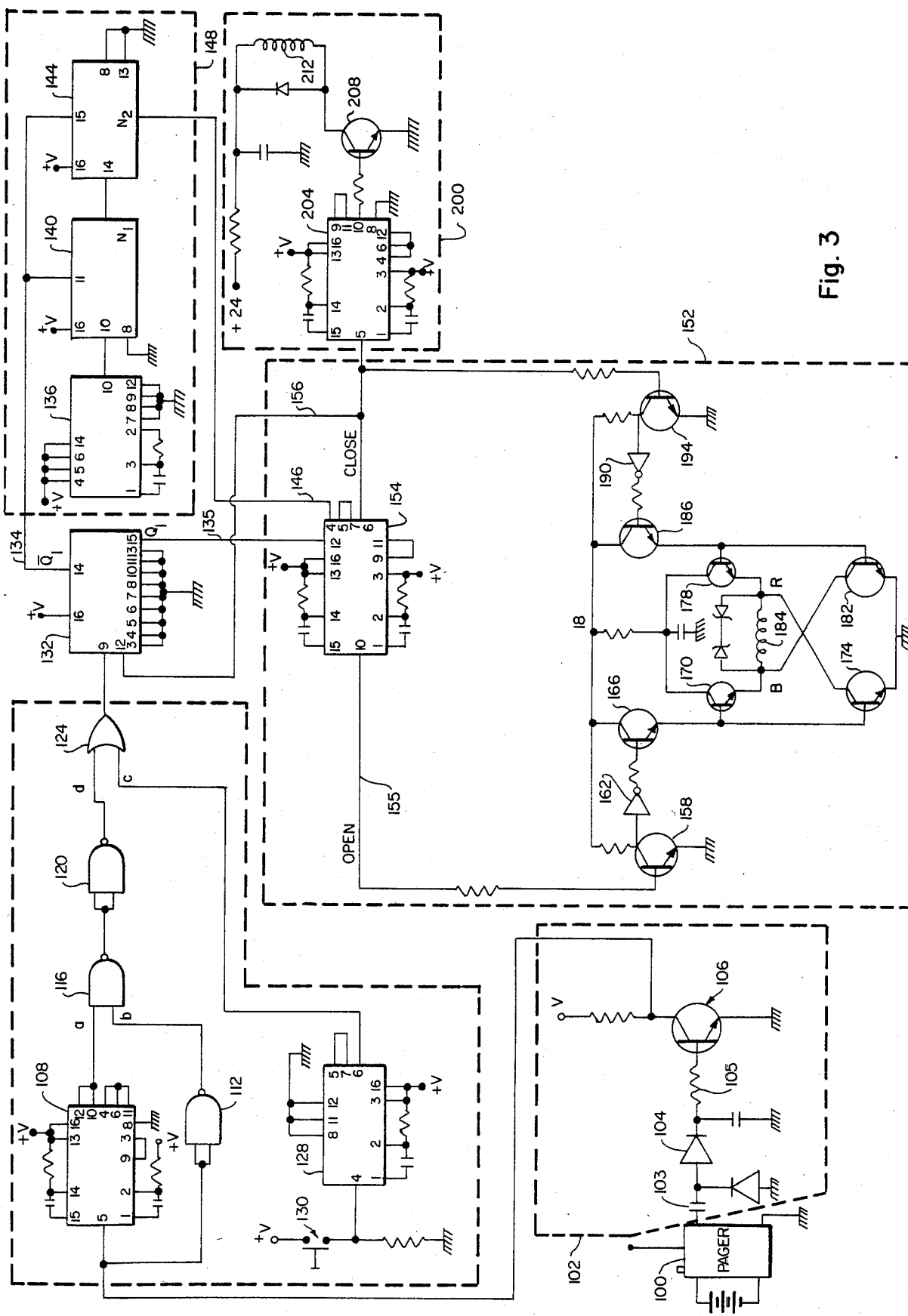
FIG. 3 is a schematic diagram of circuitry for controlling the filling and releasing operations of the stations of FIGS. 1 and 2.

The balloon filling and launching system of the present invention is especially suitable for launching balloons carrying cloud seeding materials. With the present invention, a series of balloons can be automatically filled and launched at any desired time to better disperse cloud seeding material throughout the cloud and thereby increase the liklihood of inducing precipitation.

Even though the system of the present invention is especially adapted for use in cloud seeding, it will be apparent that the system could be employed for filling and launching balloons to carry aloft a variety of payloads such as atmospheric measuring devices, testing devices, devices for conducting experiments, devices for monitoring air pollution, etc.

Referring to FIGS. 1 and 2, there are shown a top plan view of four balloon launching stations (FIG. 1) and a side, elevational view of one balloon launching station (FIG. 2). The station (FIG. 2) includes a frame having a base 4A and an upper platform 4B. Mounted on the upper platform 4B to extend upwardly is a tubular nozzle 8 with a needle-like upper end 10. The nozzle is provided as a mounting element for balloons to be launched and to convey gas into the balloons.

An illustrative way of mounting the balloons on nozzle 8 is shown in FIG. 2 to include a septum 12 made of a pliant, resilient material, for example silicone, disposed in the narrow end and opening of a balloon 14. The septum 12, which is fitted air-tight in the balloon opening, is forced onto the sharp end 10 of the nozzle 8. Gas for filling the balloon flows through the nozzle and into the balloon. When the balloon, with the septum, is forced from the nozzle, the septum will close about the opening made by the nozzle to prevent the escape of gas.

Of course other methods could be used for securing the balloon 14 to the nozzle 8, such as disclosed in the copending parent application.

Also mounted on the upper platform 4B is a rocker arm 22 arranged to pivot or rock on an axle 26 held in place by a bracket 30. The bracket 30 is attached to the top of the platform 4B. The rocker arm 22 is mounted to rock between a first position (shown in FIG. 2) in which the front end of the rocker arm contacts and presses helium supply tubing 90 (to be discussed momentarily) against the upper platform 4B, and a second position in which the back end of the rocker arm contacts and presses helium supply tubing 34 against the platform 4B.

Coupled to the lower end of the nozzle 8 is a flexible and resilient section of tubing 34 (made of latex for example), which extends upwardly and over a portion of the upper platform 4B (FIG. 1) located underneath the back end of the rocker arm 22. The tubing 34 then extends to an adjacent balloon launching station where it extends upwardly and over another portion of the platform 4B located underneath the front end of the adjacent rocker arm 38 (FIG. 1). From there, the tubing 34 is coupled to a source of helium 42. This source might illustratively be a feeder line leading from a storage tank filled with helium under pressure.

As also best seen in FIG. 1, the front end of the arm 22 extends past one side of the nozzle 8. An accessory arm 46 is attached to the rocker arm 22 to extend transversly of the arm 22 and then parallel therewith and past the other side of the nozzle 8. The accessory arm 46 may be attached by bolts, rivets, or other suitable fastening elements.

Prior to balloon filling and launching, rocker arm 22 is biased to the first position by a hinged support 50 which forces the back end of the arm 22 to remain in the first position. The support 50 includes a base leaf 50a mounted on the platform 4B, and a pivoting leaf 50b coupled by a hinge 51 to the base leaf to pivot toward and away from the rocker arm 22. The pivoting leaf 50b includes a slot 52 (FIG. 2) into which the back end of the arm fits, and which supports the arm to maintain it in the first position.

Control of the release of the rocker arm 22 to allow it to move from the first position to the second position is effectuated by a solenoid mechanism which includes a solenoid 54 carried by a bracket 56 which extends downwardly from the solenoid. The bracket 56, in turn, is mounted by an arm 57 to a block of material 58 which is positioned to slide longitudinally within a hollow rectangular tube 62. The tube 62 is held in place by braces 64 which are affixed to the platform 4B. A slot 68 is formed in the back side of the tube 62 to extend substantially the full length thereof. The arm 57 projects through the slot 68 and slides therein as the block 58 slides within the tube 62.

The block 58 is caused to move from one end of the tube 62 (the lower end in FIG. 1) to the other end (the upper end in FIG. 1) by a weight 72 which is connected by way of a cable 76 to the block. The cable 76 extends from the block 58, through the tube 62 and over a pulley wheel 80 to the weight 72 which hangs downwardly from the pulley wheel as shown. The pulley wheel 80 is mounted at the end of the tube 62. The weight 72 supplies a force to pull the block 58, and thus the solenoid 54, along the tube 62 until stopped at one of the stations by contact of the lower end of bracket 56 with the side of a rocker arm. When the rocker arm moves from the first position to the second, the back end of the arm falls below the bottom end of the bracket 56 so that the block 58 and solenoid 54 may be pulled to the next station.

The solenoid 54 includes a movable core 82 which, when the solenoid is energized by way of leads 86, is caused to move toward and strike pivoting leaf 50b. The pivoting leaf is thus caused to pivot rearwardly to release the rocker arm 22 and allow a spring 84, coupled between the rear end of the arm and the base 4A, to pull the arm to the second position. After the solenoid 54 is energized (and then deenergized), a coil spring 88 mounted on the back end of the solenoid and inside a housing 89 pulls the core 82 back to its "pre-energized" position.

When the balloon launching system of the present invention is used for cloud seeding, a payload 70, such as one consisting of a pyrotechnic material embedded with silver iodide, is attached by a tether 74 to the neck of the balloon 14. The payload 70 is electronically enabled upon release of the balloon. This occurs by closure of a payload switch 78 at the time of release. When the rocker arm 22 is in the first position, the switch contacts 78 are kept apart by a strip 79 of non-conducting material extending upwardly from platform 4B. The switch contacts 78 are biased to close when rocker arm 22 moves from the first to the second position to force the septum 12 from the nozzle 8 and thus the payload 70 and switch from the strip 79.

To operate the system, a latching solenoid valve 92 (FIG. 1) is opened (by control circuitry of FIG. 3 which will be described later) to allow helium to flow to the feeder line 42. Assuming that balloon 14 of FIG. 2 is the next balloon to be filled, helium would flow via tubing 34 and nozzle 8 into the balloon. To allow the filling of balloon 14, rocker arm 38 must be in the second position (the corresponding balloon having been launched) so that the helium can flow into nozzle 8. (It should be noted here that the nozzle of the first launching station of an array of stations is connected directly to helium feeder line 42 after passing underneath the back end of the rocker arm of the first station; for the last station of the array, there is no helium supply tubing passing under the front end of the rocker arm for the last station.)

After a predetermined period of time sufficient to allow filling of the balloon 14, a signal is applied to latching solenoid valve 92 to stop the flow of helium. Then, electrical current is applied to conductor wires 86. This current energizes solenoid 54 causing core 82 to strike the upper end of the pivoting leaf 50b so that it is pushed away from the back end of rocker arm 22. Consequently, coil spring 84 pulls downwardly on the end of rocker arm 22 so that rocker arm 22 is caused to move from the first position (FIG. 2), where tubing 90 is being pinched closed, to the second position to contact and pinch closed tubing 34. This action stops any subsequent flow of helium into nozzle 8. (When latching solenoid valve 92 is turned on for the next balloon launch, the helium will flow to that balloon.) As rocker arm 22 moves from the first position to the second position, the front end of the rocker arm 22 contacts balloon 14 (septum 12) to force the balloon off the nozzle 8 and into the atmosphere. Also, by the movement of the rocker arm 22, the bracket 56 is free of the rocker arm so that the weight 72 is allowed to pull the block 58 and attachments to the next station where the bracket comes into contact with, and is stopped by, the next rocker arm which is still in the first position.

Payload 70 is activated sometime after launching to cause release of silver iodide crystals into the cloud being seeded. The time of activation of the payload is selected in accordance with the height and/or temperature of the cloud.

After launching of balloon 14 is completed, the next station in the array is ready for the balloon mounted on that station to be filled and launched; this will occur upon receipt of appropriate signals from the control circuitry.

After a series of balloons are launched in the manner described (at whatever intervals are desired), the system is reloaded by sliding block 58 and attachments back to the original position and resetting the hinged supports 50 under the back end of corresponding rocker arms. Then new balloons are mounted onto corresponding nozzles, payloads are attached to the balloons, and payload switches are placed over strips of material such as strip 79.

FIG. 3 is a schematic diagram of circuitry for controlling the filling and launching of the balloons from the stations of FIGS. 1 and 2. This circuitry may be activated remotely by a telephone signal or radio signal. The circuitry responds to such activation signals by initiating the sequence of actions described above. Each activation will produce the launching of one balloon.

The circuitry of this embodiment includes a conventional radio pager 100 for receiving radio "launch" signals. Two calls are required to initiate the filling and launching of a balloon. The second call must be separated from the first call by a fixed minimum time period, such as 20 seconds, and a fixed maximum time period, such as 1 minute. The purpose of this is to reduce the chance of false initiation of a balloon launch.

The first such call results in the pager 100 producing a positive going pulse which is applied to signal conditioning circuitry 102. The positive going pulse is supplied via a capacitor 103, a diode 104 and resistor 105 to a transistor 106 to turn the transistor "on". This results in a negative going signal being supplied to section A of a multivibrator 108 to trigger operation of the multivibrator. After a preselected delay, e.g., 20 seconds, input lead a of a NAND gate 116 is enabled by the multivibrator 108. Simultaneously, the negative going signal is applied to a NAND gate inverter 112 and is inverted to a positive going signal which is supplied to input lead b of NAND gate 116. Because the input lead a of NAND gate 116 is still low during the delay period, the positive going signal on lead b is not passed through NAND gate 116. At the end of the delay period, section B of the multivibrator 108 is internally triggered so that a positive enabling pulse is applied to lead a of NAND gate 116.

The second call received by the pager 100 produces another negative going signal on the input of section A of the multivibrator 108. This signal has no effect on the multivibrator because it is held in a reset mode by an internally generated signal. This same negative going signal is applied to the NAND gate inverter 112 and appears as a positive going signal on lead b of NAND gate 116.

The positive enabling pulse applied to pin a of NAND gate 116 togehter with the positive going signal on pin b of the NAND gate cause the output of the NAND gate to go from a high to a low voltage condition. This transition from a high to low voltage state is inverted by a NAND gate inverter 120 to a low to high transition, which is passed through an OR gate 124 to trigger a flipflop 132.

A similar low to high transition may be generated by a multivibrator 128 by actuation (closure) of the manual launch switch 130. In this case only one actuation is needed since the purpose of the two signals described earlier is to decrease the possibility of false launch signals triggering the system.

Whichever method is used for initiating the filling and launching of a balloon, the result is that a positive signal passed through OR gate 124 will cause flipflop 132 to change state and initiate a launch cycle as follows. First a control line 134 connected to counters 140 and 144 is switched from high to low which enables these counters. Simultaneously, a pulse is sent via line 135 to section A of a multivibrator 154 which initiates a balloon filling sequence. The multivibrator 154, in turn, applies a signal to a transistor 158 to turn on the transistor. The transistor 158 then supplies a negative signal to an inverter 162 which inverts the signal to turn on a transistor 166. Transistor 166 turns on transistors 170 and 174. Turning on transistor 170 raises lead B of a coil 184 to a positive voltage level. At the same time, lead R of the coil 184 is placed at ground level by transistor 174. With lead B high and lead R low, the coil 184 is caused to open the latching solenoid valve 92 (FIG. 1). This valve is latched open until a "fill" timer 148 reaches a predetermined count selected to allow adequate time to fill a balloon with helium. When the timer 148 reaches the desired count, the latching solenoid valve 92 is closed.

Fill timer 148 establishes the time allotted for filling the balloon. A time generator 136 is set to produce, for example, two pulses per second. These pulses are fed to counters 140 and 144 but are counted only when the counters are enabled by the flipflop 132 via line 134. Both counters 140 and 144 are reset to zero at the end of each launch cycle. Counters 140 and 144 allow for the selection of a variety of time periods during which the balloons may be filled. A specific time is selected by designating specific pin numbers for outputs $N_1$ and $N_2$ of counters 140 and 144 respectively. When the counters reach the preselected count, counter 144 supplies a signal via line 146 to section B of the multivibrator 154. This signal initiates closure of the latching solenoid valve 92. In particular, the multivibrator 154 responds to the signal by supplying a positive pulse to a transistor 194 to turn on the transistor. Transistor 194 then produces a negative going pulse which is inverted by an inverter 90 for application to a transistor 186 to turn on the transistor. Transistor 186 then supplies a positive going signal to transistors 178 and 182. Transistor 178 raises the voltage level of the R lead of the coil 184 and transistor 182 grounds the B lead. This in turn, causes coil 184 to close the latching solenoid valve 92.

The "close" signal from section B of multivibrator 154 is also supplied both to the flipflop 132 via line 156 to cause the flipflop to reset, and via line 134 to reset counters 140 and 144 in preparation for the next launch.

The final phase of a given launch cycle is produced by the same pulse from section B of the multivibrator 154 that closed the latching solenoid valve 92. This pulse is also fed to a multivibrator 204 which supplies a delayed positive going pulse to a transistor 208. This pulse turns on the transistor 208 and this, in turn, energizes a coil 212 (of solenoid 54 in FIGS. 1 and 2) so that a pivoting leaf, such as pivoting leaf 50b, is pushed away from a rocker arm, such as rocker arm 22, to launch a balloon.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A system for automatically launching balloons comprising
a balloon station frame,
nozzle means mounted on the frame on which the narrow end of a balloon may be mounted and through which gas may flow into the balloon,
flexible conduit means for supplying gas to the nozzle means,
gas flow control means responsive to an "open" signal for allowing gas to flow through the conduit means, and responsive to a "close" signal for preventing the flow of gas through the conduit means,
release means responsive to "release" signals for separating the balloon from the nozzle means to thereby release the balloon to the atmosphere, said release means including
 a rocker arm mounted on the frame to rock between a first position, in which the arm is out of contact with the flexible tubing, and a second position, in which the arm contacts and pinches closed the flexible tubing to prevent the flow of gas to the nozzle means and also contacts the balloon to force it off the nozzle means,
 a support member movable between a support position, where the rocker arm is held in the first position by the support member, and a release position where the rocker arm is released from being held, and
 biasing means for biasing the rocker arm to the second position upon movement of the support member from the support position to the release position, and
control circuit means for producing the "open", "closed", and "release" signals.

2. A system as in claim 1 wherein said release means further comprises a trigger element responsive to a release signal for moving into contact with the support member to force it from the support position to the release position.

3. A system as in claim 2 wherein the biasing means comprises a spring coupling one end of the rocker arm to the frame.

4. A system as in claim 3 wherein said trigger element comprises a solenoid.

5. A system as in claim 4 wherein said support member comprises a hinge having a base leaf mounted to the frame and a pivoting leaf pivotally coupled to the base leaf for pivoting between the support position and release position, said pivoting leaf having a slot into which one end of the rocker arm is received when the rocker arm is in the first position and the support member is in the support position.

6. A system for automatically launching balloons comprising
a balloon station frame,
nozzle means mounted on the frame on which the narrow end of a balloon may be mounted and through which gas may flow into the balloon,
flexible and resilient conduit means for supplying gas to the nozzle means,
gas flow control means responsive to an "open" signal for allowing gas to flow through the conduit means, and responsive to a "close" signal for preventing the flow of gas through the conduit means,
release means responsive to "release" signals for separating the balloon from the nozzle means to thereby release the balloon to the atmosphere,
control means for producing the "open", "closed" and "release" signals,
a payload attached to the balloon,
switch means having open and closed conditions and disposed on the payload to activate the payload when in the closed condition, and
mounting means on which the switch means may be demountably placed,
said switch means being in the open condition when placed on the mounting means and automatically closed when removed from the mounting means.

7. A system as in claim 6 wherein said switch means comprises a pair of contact elements normally biased to touch one another, said switch means being in the open condition when the contact elements are out of touch and in the closed condition when the contact elements are touching, and wherein said mounting means comprises an upright bar receivable between the pair of contact elements to separate the elements when the switch means is mounted on the bar.

8. A system for automatically filling and launching a plurality of balloons comprising
a plurality of nozzles on each of which the narrow end of a balloon may be mounted and through which gas may flow into a balloon mounted thereon,
a plurality of flexible and resilient conduits, each coupled to a gas supply and to a different nozzle for supplying gas to the nozzle,
a plurality of movable elements, said movable elements each comprising a rocker arm mounted on the support frame to rock between a first position in which the arm pinches against the frame the conduit coupled to the next adjacent nozzle, and a second position in which the arm pinches against the frame the conduit coupled to the associated nozzle and alo contacts the balloon on the associated nozzle to force the balloon from the nozzle, a plurality of support members, each associated with a different rocker arm and each movable between a support position where the associated rocker arm is held in the first position, and a release position where the associated rocker arm is released to move from the first position, a plurality of biasing means, each for biasing a different rocker arm to the second position upon movement of the associated support member from the support position to the release position, control circuit means for producing a series of electrical signals, and a trigger element responsive to an electrical signal for urging an adjacent support member from the support position to the release position.

9. A system as in claim 8 further comprising a carriage means mounted on the frame to carry the trigger element from adjacent one support member and associated rocker arm, where the trigger element is positioned to urge said one support member to move to adjacent a next support member and associated rocker arm, where the trigger element is positioned to urge said next support member to move.

10. A system as in claim 8 wherein said carriage means includes stop means for contacting each rocker arm adjacent to which the trigger element is moved, when said each rocker arm is in the first position, to thereby prevent further movement of the carriage means and trigger element, said stop means being positioned so as not to contact a rocker arm when the rocker arm is in the second position, said system further including means for urging the carriage means to move from adjacent one rocker arm to adjacent a next rocker arm.

* * * * *